United States Patent [19]

Grübner

[11] Patent Number: 4,611,364
[45] Date of Patent: Sep. 16, 1986

[54] WINDSHIELD WIPER FOR LAND, SEA AND MARINE VEHICLES, IN PARTICULAR FOR TRUCKS (LORRIES) AND PASSENGER AUTOMOBILES

[76] Inventor: Kurt Grübner, Birkenhainer Str., D-6464 Linsengericht-Waldrode, Fed. Rep. of Germany

[21] Appl. No.: 716,404

[22] Filed: Mar. 27, 1985

[30] Foreign Application Priority Data

Apr. 14, 1984 [DE] Fed. Rep. of Germany ....... 3414181

[51] Int. Cl.$^4$ .............................................. B60S 1/34
[52] U.S. Cl. .................................. 15/250.22; 15/250.3; 15/250.41
[58] Field of Search ............... 15/250.22, 250.3, 250.41

[56] References Cited

U.S. PATENT DOCUMENTS 2,784,437  3/1957  Haas ................................. 15/250.22

FOREIGN PATENT DOCUMENTS 2700527  9/1978  Fed. Rep. of Germany ... 15/250.41

Primary Examiner—Peter Feldman
Attorney, Agent, or Firm—Wells & Wells

[57] ABSTRACT

A windshield wiper, in particular for trucks (lorries) and passenger automobiles, comprises a device for increasing the cleaning intensity which is determined, in known wipers, merely by the sweeping force of the wiping blade; this cleaning intensity-increasing device comprises one or several rotating brush rollers which are associated with the wiping blade borne by the wiping arm—of which blade there can be several arranged thereon. The brush roller can be oriented parallel, or at an angle, with the wiping blade. Or, the cleaning intensity-increasing device comprises a plurality of plate brush units and one or several rows of pinions in engagement with one another, or tangentially engaging friction wheels, serving as driving device for the said plate brush units. The plate brushes in the units have their bristles turned against the windshield and are adapted for being driven alternatingly in opposite senses of rotation. This drive can be effected either by the wiper motor via appropriate transmission elements which always switch to the opposite sense of rotation at each sweep end position of the wiper lever, or they can be driven in a constant sense of rotation by a separate electric motor.

3 Claims, 5 Drawing Figures

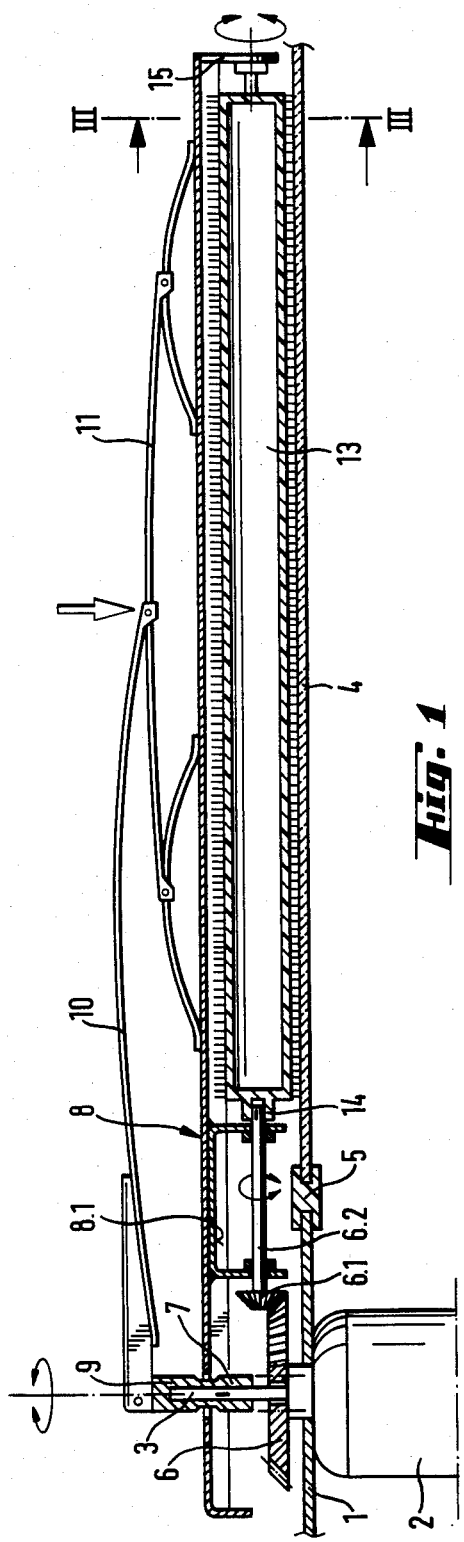
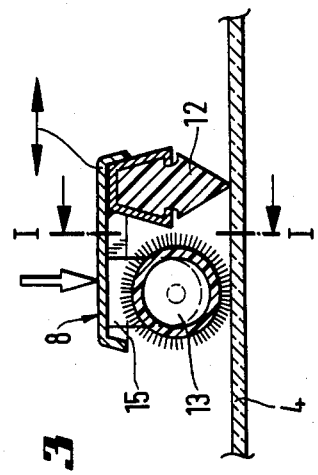
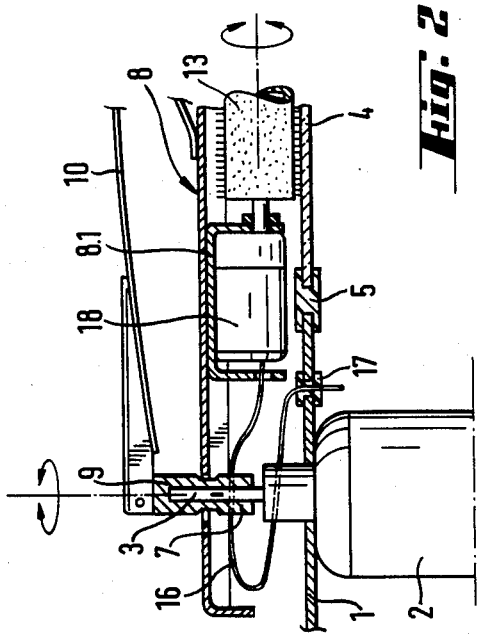
Fig. 1
Fig. 3
Fig. 2

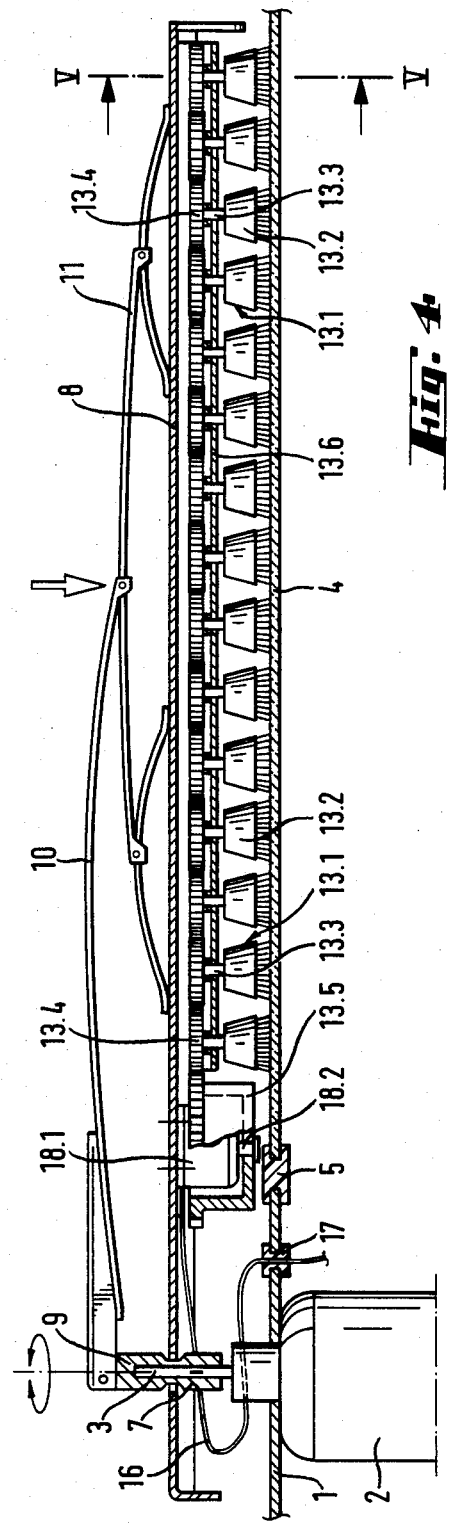
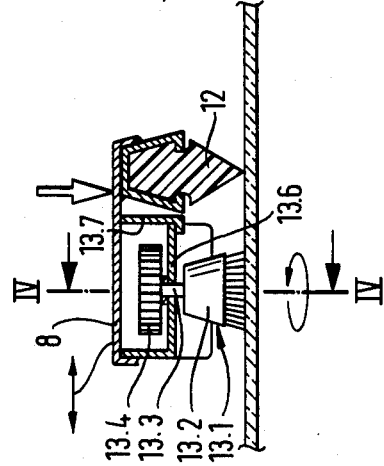

WINDSHIELD WIPER FOR LAND, SEA AND MARINE VEHICLES, IN PARTICULAR FOR TRUCKS (LORRIES) AND PASSENGER AUTOMOBILES

BACKGROUND OF THE INVENTION

This invention relates to a windshield wiper adapted for use with the normally curved windshields of land, air and marine vehicles, in particular for trucks (lorries) and passenger automobiles.

Known windshield wipers of this kind have a predetermined sweeping angle of maximally about 180 degrees between two end positions, and comprise a wiper motor for reversing the direction of the sweeping wiper at each such end position and having a stub shaft, a wiper lever articulatedly connected with said stub shaft and adapted for being swung away from the said windshield, and a wiping arm carrying at least one wiping blade and being connected with the remainder of the wiper via a spring clip combination.

According to Lueger, "rororo" publication volume 13, page 523, the wiper lever carries out about 50 to 70 sweeping movements per minute, and the drive thereof comprises as a rule two velocity stages of 50 sweeps per minute and 70 sweeps per minute. In order to increase the effectiveness of the windshield wiper, it is used, generally, in combination with a windshield scourer, whose water can be heated by means of a heat exchanger whose construction is based on the principle of an immersion heater, and shield-cleaning agents can be added to the water.

Making use of these two auxiliary measures will provide an increase in scouring intensity, in particular as long as the wiping blade is still new, i.e. its edge has not yet been damaged.

These conditions change, however, very rapidly, when, for instance, wiping is done without the use of water or when the windshield wiper is employed in removing icing from the shield as it is often formed in winter.

A further problem, arising at least in certain types of vehicles having a curved windshield when trying to ensure a substantially uniform pressure of the wiper blade against the windshield, can be considered solved generally by the combination of the spring clip combination connecting the wiper lever and the wiper arm.

In spite of this relatively great technical effort, the known windshield wiper installations cannot overcome the dirtying effect occurring in particular when the roads are wet,—which effect is particularly strong when it is caused, for instance, by a preceding vehicle,—with sufficient quickness and with a satisfactory cleaning result; it thus becoming possible that traffic will be endangered by insufficient visibility.

This is true particularly when encountering oil- or silicone-containing layers of dirt which form streaks on the road encumbering the driver's view.

These streaks are, in fact, less disturbing in their effect when the windshield is dry; however, they are quickly regenerated when rain starts up again, and can often not be removed by a single sweep of the wiper blade even when repeated; often it becomes necessary to stop the vehicle and descend from it to clean the windshield by hand, e.g. with the aid of paper napkins.

OBJECTS AND SUMMARY OF THE INVENTION

In view of these facts, it is an object of the invention to provide a windshield wiper of the initially described type which is capable of acting upon a layer of dirt on the windshield not only by sweeping of the wiping blade across the dirtied windshield with or without aid of a cleaning agent such as water, but by supplementary mechanical means.

This and other objects will become apparent, as the description of the invention proceeds, are attained in accordance with the invention by providing a windshield wiper comprising the initially described features, at least one wiper blade "or blades" which is also borne by the wiping arm while the blade rests upon the windshield; mechanical dirt-loosening brush means associated with said at least one wiping blade and consisting essentially of at least one of the following:

rotating bush rollers and plate brush units;
the windshield wiper further comprising driving means for driving the dirt-loosening means.

More in particular the dirt loosening brush means can be constituted by one or several rotating brush rollers, and the driving means can comprise one or several pinions meshing with each other; or the dirt-loosening means can be at least one plate brush unit comprising a preferably circular flat or plate brush the bristles of which point toward the windshield, and the driving means can be friction wheels adapted for driving the plate brush unit, driving at least two units alternatively and successively each time in an opposite sense of rotation.

The driving means of the brush roller or the plate brush unit comprise the wiper motor itself, reversing the sense of rotation of the driven dirt-loosening means each time the wiper lever reaches one of its end positions; or, optionally, the driving means comprise a separate motor adapted for driving the dirt-loosening means in a constant sense of rotation.

Due to the rotational movement of the brush or brushes, acting upon the layer of dirt on the windshield in addition to the action of the sweeping wiping blade, causes a preliminary loosening of the dirt facilitating the following dirt-removing action of the wiping blade, and also a subsequent cleaning of remainders of dirt, when the wiping blade sweeps back to its starting position. An optimal effect, important when using the vehicle in sporting events such as a ralley, is achieved when brushing devices are provided one of which precedes the wiping blade in a first direction of its sweep and the other precedes the wiping blade when it sweeps in the reverse direction.

Moreover, a combination is possible of brush rollers and plate brushes, optionally in combination with a plurality of wiping blades, and makes it possible to adapt the windshield wiper according to the invention to the most varied requirements occurring in practice.

The question of whether it is more practical to drive the brush device by the wiper motor or by a separate electric motor must be decided taking several aspects into consideration.

The drive of the dirt-loosening brush means by means of the wiper motor involves a reversal of the sense of rotation of the brush or brushes at each end position of a sweeping movement of the wiping arm, which has the advantage of uniform brush wear, while a drive by a separate motor involves maintaining a brush rotation in a direction independent of the sweeps of the wiper and offers the advantage of higher speeds, however with a one-sided wear of the brushes.

Whether pre-cleaning of the windshield is better or more appropriate with a brush roller, or with a plurality of oppositely rotating plate brushes, also depends on the specific conditions prevailing in each case, but at least from a point of view of cost, a brush roller should be given preference.

An appropriate embodiment of the wiper when using a brush roller provides for a bearing bracket connected with the wiping arm—directed toward the drive of the wiper lever, which bearing bracket is adapted to receive either a roller-driving shaft drivable by means of a bevel pinion and being connected with the brush roller via an elastic coupling sleeve, or the separate electric motor being connected with the brush roller.

The arrangement of the driving parts or of the separate motor for the brush roller in the vicinity of the wiper lever drive reduces the torque generated additionally in the wiper drive shaft by the weight of these parts for the swivel drive.

The elastic coupling being provided for connecting the drive with the brush roller avoids a detrimental influence on the bending properties of the windshield wiper, so that the latter, in connection with the elastic brush roller, can rest snugly on the windshield, it being advantageous, in this case, that the end of the brush roller is of fixed direction in a bearing provided at the free end of the wiping arm by way of a stub shaft.

An advantageous arrangement of plate brushes provides, for the separate drive of the plate brush unit, an electric motor, oriented toward the wiper lever drive and having a drive stub shaft pointing toward the windshield, is firmly connected with the wiping arm, and at the drive stub shaft, there is fastened a cup-shaped spur crown wheel which is in engagement with the pinion of a plate brush unit.

The use of a cup-shaped crown spur gear for driving the plate brush units permits a safe, space-saving arrangement of the separate electric motor.

With regard to the embodiment and the arrangement of the bearing of the plate brush units, it is recommended that the shafts of the plate brush units are supported in a carrier rail in positive engagement with the pinions, and that the carrier rail is held in supporting guiding means.

This kind of embodiment enables a simple and quick assembly and exchange of the plate brush units arranged in rows.

The windshield wiper according to the invention thus fully satisfies the requirements listed in describing the problem to be solved.

BRIEF DESCRIPTION OF THE DRAWING

The embodiments of a windshield wiper according to the invention comprising rotating brushes as cleaning devices, equipped with a wiping blade and a rotating brush roller or a plurality of rotating plate brushes, is explained more in detail in the following description thereof, reference being had to the accompanying drawings in which FIG. 1 shows a first embodiment of a combined windshield wiper/rotary brush-equipped cleaning device according to the invention, in a longitudinal, partially sectional view;

FIG. 2 is a partial view of another embodiment of a brush roller wiper having a separate electric motor with a drive of constant sense of rotation of the brush roller;

FIG. 3 is a cross sectional view of the first embodiment, taken in a plane indicated by III—III in FIG. 1, the structure shown being identical with the view taken in the plane indicated by III—III in FIG. 2;

FIG. 4 shows a third embodiment of the combined windshield wiper/rotary brush-equipped cleaning device comprising a separate motor, in a longitudinal, partially sectional view; and FIG. 5 is a cross sectional view taken in a plane indicated by V—V in FIG. 4

DETAILED DESCRIPTION OF THE EMBODIMENTS SHOWN IN THE DRAWINGS

The embodiment of the windshield wiper shown in FIG. 1 is of the type comprising a brush roller driven from the driving shaft of the wiper motor, sweeping and rotating with the reversals of the sense of rotation in accordance with the wiping blade movement, such embodiment being referred to hereinafter as a "brush roller wiper" for the sake of brevity.

The brush roller wiper shown in FIGS. 1 to 3 is mounted on the drive shaft 3 of the wiper motor 2 which shaft extends through a sealed opening in the car body wall 1. The windshield 4 is joined to the car body wall 1 by means of an elastomeric connecting member 5 which seals in the rims of the aforesaid two parts and comprises carrying and supporting parts (not shown).

The drive shaft 3 projects away from the car body wall and bears successively, from the outer side of the latter wall, a bevel gear 6, a carrier sleeve 7 on which the only centrally guided wiping arm 8 is loosely mounted, and a collect 9 bearing the wiper lever 10 which can be slewed away from the windshield, and is fastened via a spring clip combination 11 on the wiping arm 8. The wiping arm 8 and the brush roller 13 borne by the arm in addition to the wiper blade 12 are of such elasticity that an adaption to the curvature of the windshield 4 is achieved by the spring clip combination 11, with sufficient stiffness, for the adequate bearing 15 of the brush roller 13 and the wiping blade 12.

On the side of the driving means, the brush roller 13 terminates in an elastic coupling sleeve 14 for connection with the driving means to be described below, which drive is guided via a bearing bracket 8.1 being connected with the wiping arm 8.

With regard to the embodiment of the drive, it should be noted that there is provided a bevel pinion 6.1 which engages, at a right angle to the driving shaft 3, with the gearing of the bevel gear 6, which bevel pinion 6.1 is mounted on the end of the brush driving shaft 6.2 which is guided in the bearing bracket 8.1 and which is connected elastically with the brush roller 13 via the above-mentioned coupling sleeve 14.

The embodiment of the brush roller 13 illustrated in FIG. 3 which is driven by means of a separate electric motor 18, provides for an arrangement of the latter within the bearing bracket 8.1 which is connected with the wiping arm 8. The cable 16 which leads to the electric motor 18 emerges from the car body wall 1 as near as possible to the driving shaft, in order to have a minimum of stress of the cable during the sweeping movements of the wiping arm 8. In order to secure the cable in place, the outlet opening can be clad with an elastic sleeve 17.

A plate brush wiper having a separate, vertically oriented drive motor 18.1 is illustrated in FIGS. 4 and 5. This wiping and cleaning device comprises as the wiping arm a brush-carrying arm 8 bearing plate brushes being driven alternatively in opposite direction, in a constant sense of rotation, respectively, by a separate electric motor which is slewably arranged about the driving shaft of the wiper motor.

A further embodiment (not shown) provides for the drive of the plate brushes by the wiper motor, in accordance with FIG. 1; in this case the reversing position of the wiping arm causes, each time, reversal of the sense of rotation of the plate brushes.

In this case, the apex of the cone angle of the bevel gear driven by the motor shaft points in the opposite direction, i.e. in the direction of the wiper motor, and the shaft of the engaging bevel pinion extends parallel with the shaft of the wiper motor. This shaft also forms the shaft of the first pinion bearing a plate brush. (A spur gear drive is optional.)

In the following description, only the embodiment comprising a separate drive will be described, and the device is referred to as a "plate brush wiper" for the sake of brevity.

An an introduction to the embodiment to be described hereinafter and further existing parallel features also found in FIG. 2 with regard to the arrangement of the cable 16 in relation to the wiper motor 2 and the lead through of the cable 16 via the elastic sleeve, there is to be remarked, as a matter of principle, that the vertically oriented electric motor 18.1 is attached to the wiping arm 8 with its driving stub shaft 18.2 directed toward the plane of the windshield 4.

There is connected with the driving stub shaft 18.2 a cup-shaped crown spur gear 13.5, substantially receiving in its cavity the electric motor 18.1, and being engaged by a plate brush pinion 13.4 of a plate brush unit 13.1. The plate brush unit 13.1 consists of a plate brush 13.2 provided with a central plate brush shaft 13.3 which is limited vis-à-vis the plate brush 13.2 by the pinion 13.4.

The plate brush units 13.1 are supported by means of their shafts 13.3 in a carrier rail 13.6 in a manner such that all pinions 13.4 being arranged in a row will mesh with one another, and there will be formed a continuous positive engagement of all plate brush pinions 13.4 with the cup-shaped crown spur gear 13.5, after the carrier rail 13.6 has been completely inserted in its supporting guide elements 13.7.

In this connection, there shall be repeated that the above-described examples of embodiments can be supplemented by further wiping blades preceding or following the brushing device, or that brushing devices can be associated with the wiping blades, arranged ahead of, and/or following them, and running after and/or before them.

I claim:

1. In a pivoted windshield wiper for land, air and marine vehicles, for use with curved windshields, having a predetermined sweeping angle up to maximally about 180 degrees, comprising a wiper motor adapted for reversing the direction of the motor rotation at each end position of the sweep of the wiper, a driving motor stub shaft, a wiper lever adapted for being slewed down, from the windshield and connected with said motor stub shaft, a wiping arm, and at least one wiping blade borne by said wiping arm, the improvement comprising: a spring-clip combination connecting said wiping arm with said wiper lever said wiping arm including a separate motor and a plurality of plate brush units mounted thereon, said plate brush units being drivingly connected to said separate motor for driving said plate brush units in constant rotation.

2. The windshield wiper of claim 1, wherein said separate motor is adapted for driving at least one plate brush unit in a constant sense of direction;
    said separate motor having a driving stub shaft;
    said separate motor firmly attached to said wiping arm and pointed with said driving stub shaft thereof toward said windshield;
    said separate motor oriented toward said wiper lever, a pinion associated with a plate brush unit; and
    a cup-shaped crown spur gear adapted for partially surrounding said separate motor and being mounted on said driving stub shaft and being in engagement with said plate brush unit-associated pinion.

3. The windshield wiper of claim 2 wherein said plate brush units comprise a common carrier rail, supporting guide means for said carrier rail, and each unit comprises a plate brush shaft and a plate brush pinion mounted on said plate brush shaft,
    said plate brush shafts being supported in said common carrier rail wherein each plate brush pinion is in positive engagement with a next adjacent one.

* * * * *